Figure 1:
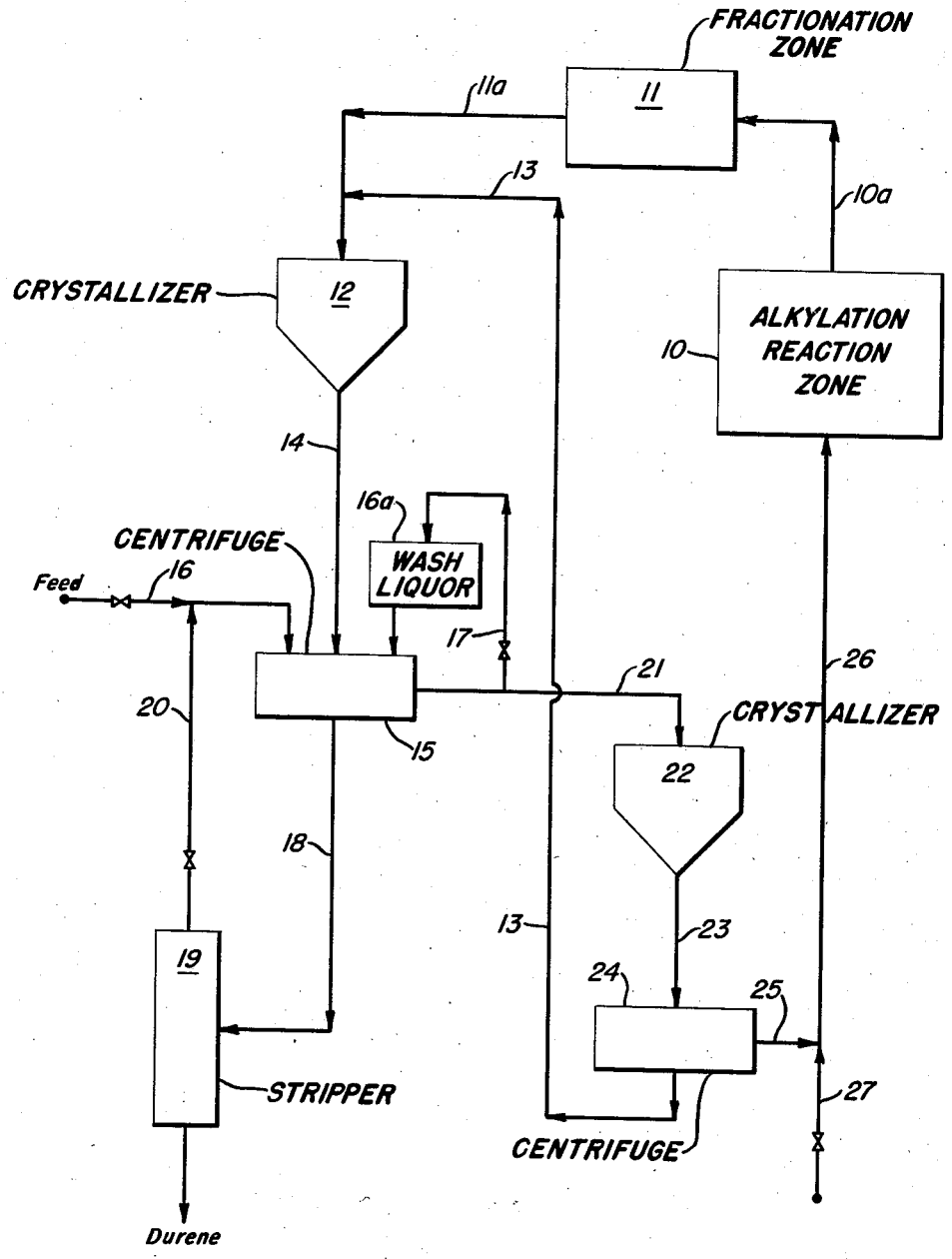

June 3, 1958 — M. C. HOFF — 2,837,584
PROCESS FOR PRODUCTION OF DURENE
Filed Oct. 31, 1955 — 2 Sheets-Sheet 1

Melvern C. Hoff
INVENTOR.

BY *[signature]*
ATTORNEY

June 3, 1958   M. C. HOFF   2,837,584
PROCESS FOR PRODUCTION OF DURENE
Filed Oct. 31, 1955   2 Sheets-Sheet 2

Melvern C. Hoff
INVENTOR.

BY

ATTORNEY

United States Patent Office 2,837,584
Patented June 3, 1958

2,837,584
PROCESS FOR PRODUCTION OF DURENE

Melvern C. Hoff, Highland, Ind., assignor to Standard Oil Company, Chicago, Ill., a corporation of Indiana Application October 31, 1955, Serial No. 543,806

6 Claims. (Cl. 260—671)

My invention relates to the production of durene from lower alkyl aromatics by alkylation processes and, more specifically, relates to a combination process wherein the feed to the alkylation is used in the purification of crude durene by crystallization.

Alkylation of lower alkyl benzenes provides a feasible means for synthesizing durene from more readily available materials. In general, alkylation produces an equilibrium reaction mixture in which the proportion of durene in the tetramethylbenzene cut is 30 to about 65 weight percent. Crude durene, of about 90% purity, can be separated readily from the alkylation reaction mixture by crystallization. Further purification, however, is more difficult and is expensive. Purification by fractional distillation is not practical. Purification can be effected by fractional crystallization, but several stages operated under carefully controlled temperature conditions are required. Solvent crystallization is simpler in procedure but is expensive because it involves solvent recovery and results in substantial losses of durene in the solvent. I have now devised a process which combines the simplicity of solvent crystallization while avoiding the cost burdens of solvent handling and recovery in separate solvent and solute cycles.

The process of the invention can be conducted by separating crude durene by crystallization from the tetramethylbenzene fraction of the alkylation reaction mixture and washing the crude fraction with alkyl aromatic feed for the alkylation step. The wash liquor may be charged directly to the alkylation operation, or advantageously may be combined with mother liquor from the crystallization and subjected to a second stage crystallization, producing a durene concentrate for recycle to the crystallization operation and a mother liquor suitable for charging to the alkylation step. Operating in this manner, substantial operating economies are produced and product losses are avoided, while a high purity durene is produced, since all components but the crystallized durene are recycled internally with fresh feed in the system. The washed durene fraction recovered in the process of the invention is melted and the wash liquor is stripped by distillation for reuse in the process.

Also, according to the invention, tetramethyl benzene fraction from alkylation of lower alkyl benzenes may be first subjected to crystallization under conditions separating durene as a crystallized component. The crude crystalline durene fraction then may be recrystallized and washed with fresh alkylation feed. Fresh alkylation feed or wash liquor is used as the solvent for the recrystallization operation. The wash liquor may be recovered for charging to the alkylation operation, advantageously after subjecting it with mother liquor from the first crystallization to a second stage crystallization to recover a durene concentrate for recycle to the first crystallization. The temperatures of crystallization will depend on the durene concentration of the fraction to be crystallized. In general, however, it is desirable to control the crystallization, and to the extent economically feasible the concentration of durene in the charge, to provide about a 20–50% solids content in the crystallized slurry. Crystallization temperatures within the range of about —50° C. to 30° C. generally will be suitable.

Figure 2:
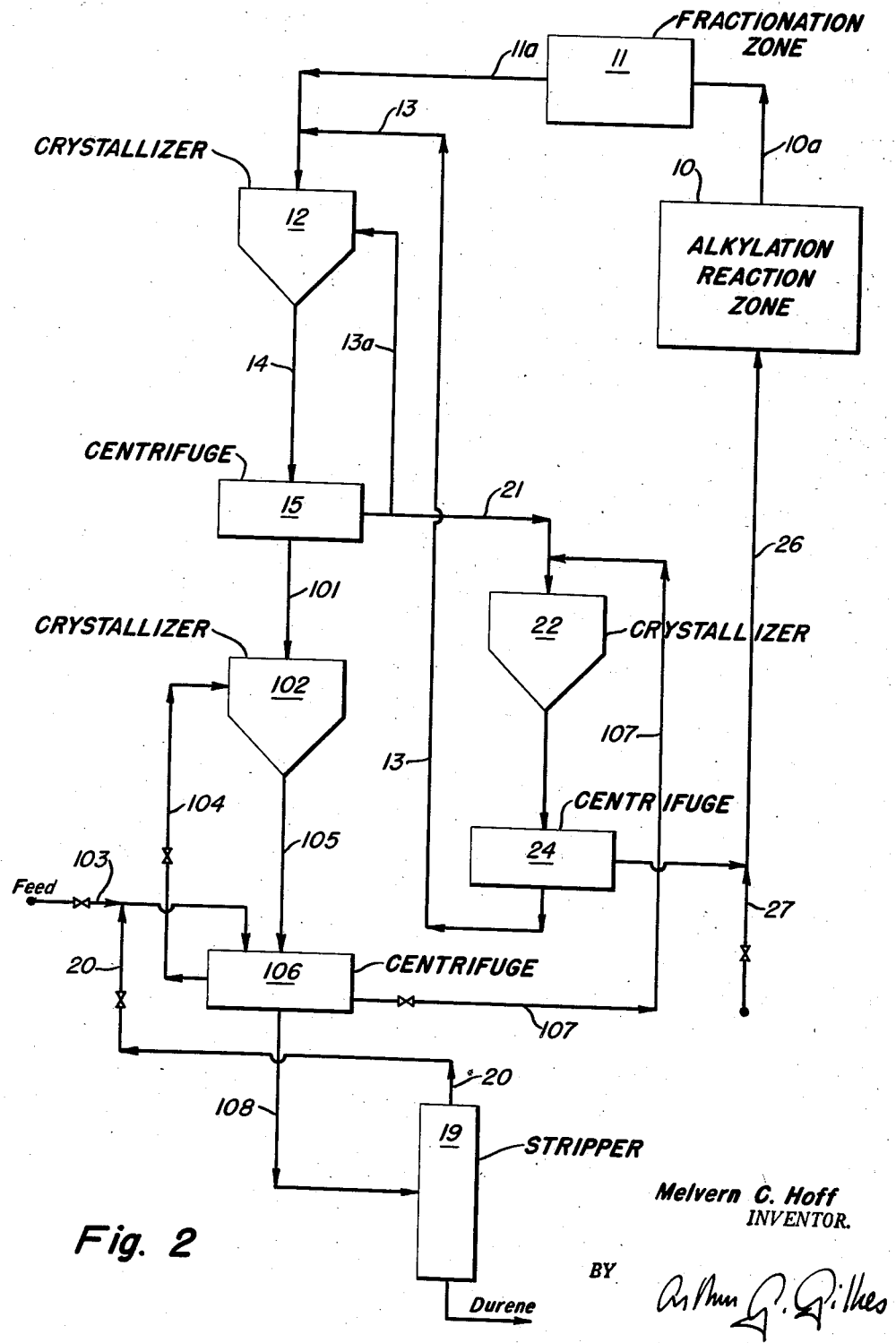

Processing procedure according to the invention is illustrated in Figures 1 and 2 of the accompanying drawings which are respectively block diagrams of alternative modes for practicing the invention.

In the procedure illustrated in Figure 1, the effluent from alkylation reaction zone 10 is passed by means of line 10a to fractionation zone 11 from which is obtained a tetramethyl benzene fraction which is sent to crystallizer 12 via line 11a. Product from the second stage crystallizer 22 from line 13 also may be added to the crystallization charge. In crystallizer 12, the tetramethyl benzene fraction formed in the alkylation zone is crystallized by cooling to a temperature in the range of about 10° to 30° C., preferably about 15° to 25° C. in order to obtain a 20 to 50% solids slurry. The solids content of the slurry can be adjusted as desired by recycle of mother liquor from a subsequent separation zone. The slurry is passed by means of line 14 to centrifuge 15. The crude durene cake obtained by centrifugation is washed with fresh alkylation feed, which is charged to the system by means of line 16. In operation, it may be desirable to wash the crude cake with wash liquors from a previous batch collected in holding vessel 16a, followed by washing with from about 25 to about 50 mole percent of fresh alkylation feed charged through line 16 and recirculated via line 17. The washed crystals separated by means of centrifuge 15 are then melted and passed as indicated by line 18 to stripper 19. Residual wash liquor is removed in stripper 19 and may be recycled as shown by line 20. Durene of 97 to 99.9 percent purity is recovered as bottoms from stripper 19.

Mother liquor separated by means of the centrifuging operation 15 may be passed by line 21 to second stage crystallizer 22. A lower temperature, e. g. from about —10 to —30° C., is used in crystallizer 22. The resulting slurry is passed by means of line 23 to centrifuging operation 24 wherein a durene concentrate is separated and advantageously is recycled after melting via line 13 to the first stage crystallizer 12. The mother liquor from centrifuge 24 is charged by means of lines 25 and 26 to alkylation reaction zone 10. Fresh alkylation feed, above the wash liquor required and charged via line 16, may be charged by means of valved connection 27.

As illustrated in Figure 2, the tetramethyl benzene fraction from fractionation zone 11 is charged through line 11a to crystallizer 12. A crystallization temperature in the range of about 10 to 30° C., preferably 15 to 25° C. is maintained. A 20 to 50% solids slurry advantageously is maintained by adjusting the solids content by recycle through lines 13 and/or 13a. The resulting slurry is passed via line 14 to centrifuging operation 15. The separated crystalline product is passed via line 101 to crystallizer 102 wherein it is recrystallized at a temperature in the range of about —20 to 30° C., preferably 15 to 25° C., from a medium comprising alkyl benzene feed for alkylation reaction zone 10 and which is introduced to the system in a subsequent washing operation by means of lines 103 and 104.

The slurry from the recrystallization operation 102 is passed by means of line 105 to centrifuging operation 106. A part of the mother liquor separated by centrifuging may be recycled, but part advantageously is charged to second stage crystallizer 22 via line 107. The crystalline cake from the centrifuging operation 106 is washed on the centrifuge with from about 50 to 90 mol percent of fresh alkylation feed introduced through line 103 and the wash liquors recovered from the operation are passed via line 104 to crystallizer 102 for use as solvent for the recrystallization operation. The washed crystals recovered from centrifuging operation 106 are melted and passed as indicated by line 108 to stripper 19 where residual wash liquor is removed for recycle via line 20 and from which purified durene is recovered as bottoms.

The mother liquor from the first stage crystallization may be combined in line 21 with mother liquor from the recrystallization operation (from line 107) for a second stage crystallization in crystallizer 22. The second stage crystallization temperature may be in the range of about —10 to —30° C.

Illustrating the crystallization operation of the invention, 254 parts of 90 percent durene recovered by crystallization from a tetramethylbenzene fraction are dissolved in 193 parts of trimethylbenzene (1,2,4-trimethylbenzene). The mixture is cooled to —15° C. and the resulting slurry is centrifuged. The crystal mass on the centrifuge is washed with 100 grams of trimethylbenzene. The remaining crystal mass is then centrifuged dry and topped to remove solvent. From 171 parts charged, 19.4% is taken overhead and 80.6% is recovered as 99.7% durene for an overall recovery of 60.5% per pass. To obtain equivalent purity by conventional fractional crystallization, an additional crystallization step is required and the recovery per pass is 57.5%.

In further illustration, 672 parts of tetramethylbenzene fraction containing 304 parts of durene (45.2%) is cooled to 10° C. and is centrifuged to yield about 272 parts of 90% durene. The crystal mass is washed with 50 parts of durene-saturated, wash liquor obtained from the previously described run, followed by 100 parts of fresh trimethylbenzene. The centrifuge residue amounts to 200 parts of purified durene for a recovery of 65.7%. The durene fraction is topped to remove solvent, 16% being taken overhead and 84% being recovered as 97.7% durene. The overall recovery is 55.2% per pass.

Corresponding recovery for a 2-stage fractional crystallization requiring an additional crystallizer is only 46% for equivalent purity.

A number of known alkylation procedures can be employed in the alkylation step with advantage. The essential consideration is that the process produces an equilibrium reaction mixture containing sufficient durene to make its recovery by crystallization attractive. Unconverted or partially converted material and isomeric forms are recycled without effecting separate recovery. The feed to the process may comprise one of the trimethylbenzenes, a xylene, or mixtures thereof. The use of toluene also is feasible although it appears to be less attractive from the economic standpoint.

The alkylation can be conducted using methanol or methyl chloride, for example, as the methylating agent. The reaction with methanol may be conducted in either the liquid or vapor phase in the presence of a solid catalyst such as a typical solid type, phosphoric acid polymerization catalyst. The reaction may be conducted in the vapor phase using a typical silica-alumina cracking catalyst. Elevated temperatures in the range of 300 to 500° C. are suitable. With methyl chloride, the alkylation is catalyzed by aluminum chloride at about 20° to 100° C. A solid catalyst, as in the case of methanol, also can be used.

The methylation reaction can also be effected with trimethylbenzene and xylene feeds by disproportionation in the presence of an acid type catalyst such as aluminum chloride-hydrogen chloride or hydrogen fluoride at temperatures in the region of 100 to 150° C. The disproportionation also can be effected at higher temperatures in the vapor phase over solid catalysts such as those mentioned above.

I claim:
1. In the production of durene from an alkyl benzene in a cyclic process which includes alkylation of alkyl benzenes under equilibrium alkylation conditions in an alkylation reaction zone and recovery of a high purity durene product in subsequent separation and purification zones and wherein feed for the alkylation reaction is charged to the purification zone, the steps of producing a mixture enriched in tetramethylbenzenes by methylation of a recirculating mixture of alkyl benzenes with a methyl donor in the presence of an acid-type alkylation catalyst in the alkylation reaction zone, fractionating the alkylation reaction mixture to recover the tetramethylbenzenes fraction, crystallizing a durene fraction from said tetramethylbenzenes fraction, separating the crystallized durene fraction and mother liquor, contacting the durene fraction with a liquid comprising feed for the alkylation reaction, recovering a crystalline durene fraction therefrom which is substantially free of tetramethylbenzene isomers other than durene and residual contact liquor containing said isomers, charging said contact liquor and the first mentioned mother liquor to the alkylation reaction and stripping the crystalline durene fraction to recover a 97+% durene product.

2. The process according to claim 1 wherein the feed for the alkylation reaction is a tri-methylbenzene.

3. The process according to claim 1 wherein the crude durene fraction obtained from said crystallization is first dissolved in the contact liquid in the contacting step, a purified durene fraction is crystallized therefrom, said purified durene fraction is washed with fresh feed for the alkylation reaction and the resulting wash liquor is employed as said contact liquor in the contacting step, and wherein the mother liquors from the first and second mentioned crystallizations are charged to the alkylation reaction.

4. The process according to claim 1 wherein the crude durene fraction obtained in the crystallization is washed with fresh feed to the alkylation reaction in said contacting step to produce the crystalline durene fraction substantially free of tetramethylbenzene isomers other than durene, the wash liquor and durene fraction are separated, the washed durene fraction is stripped, and wherein the wash liquor and the first mentioned mother liquor are charged to the alkylation reaction.

5. The process according to claim 4 wherein the wash liquor and the mother liquor are subjected to a second stage crystallization for recovery of a second crude durene fraction, wherein said crude durene fraction is recycled to the first crystallization, and wherein the mother liquor from the second stage crystallization is charged to the alkylation reaction.

6. A process according to claim 5 wherein liquid recovered from the purified durene fraction in the stripping step is recycled to the contacting step as a part of the wash liquor.

References Cited in the file of this patent
UNITED STATES PATENTS

| | | |
|---|---|---|
| 2,529,803 | Gonze | Nov. 14, 1950 |
| 2,533,232 | Dressler | Dec. 12, 1950 |
| 2,731,456 | Weedman | Jan. 17, 1956 |
| 2,756,261 | Fetterly | July 24, 1956 |

FOREIGN PATENTS

| | | |
|---|---|---|
| 736,447 | Great Britain | Sept. 7, 1955 |